United States Patent Office 3,462,439
Patented Aug. 19, 1969

3,462,439
ESTERS OF HETEROCYCLIC-VINYL-PHOSPHONATES
Ivan C. Popoff, Ambler, Pa., and James Louis Dever, Lewiston, N.Y., assignors to Pennsalt Chemicals Corporation, Philadelphia, Pa., a corporation of Pennsylvania
No Drawing. Filed June 16, 1966, Ser. No. 557,889
Int. Cl. C07f 9/58, 9/32
U.S. Cl. 260—290    8 Claims

ABSTRACT OF THE DISCLOSURE

Esters of heterocyclic vinyl phosphonates useful as plant growth control agents and pesticides are provided having the formula $$\begin{array}{c}RO\\ \diagdown\\ RO\diagup\end{array}\!\!\overset{O}{\overset{\|}{P}}\!\!-CH\!=\!CH\!-\!R'$$

where R is a hydrocarbon or substituted hydrocarbon radical, and R' is an unsubstituted or substituted heterocyclic radical selected from the group consisting of

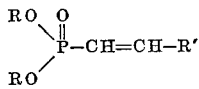

This invention relates to novel esters of heterocyclic-vinyl-phosphonates and to their uses as plant growth control agents and pesticides.

More specifically, the invention relates to compounds of the general formula $$\begin{array}{c}RO\\ \diagdown\\ RO\diagup\end{array}\!\!\overset{O}{\overset{\|}{P}}\!\!-CH\!=\!CH\!-\!R'$$

in which R is hydrocarbon or substituted hydrocarbon radical, preferably a lower alkyl with from 1 to about 12 carbon atoms; phenyl; and phenyl substituted with a substituent selected from the group consisting of alkyl with from 1 to about 12 carbon atoms, halogen, —NO₂, or —COOR", in which R" is alkyl with from 1 to about 6 carbon atoms; and R' is an unsubstituted or substituted heterocyclic radical preferably selected from the group consisting of

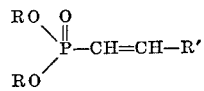

When R' is substituted it can be

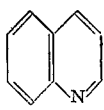

R' can also be

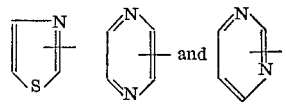

Specific compounds to which this invention is directed are dibutyl 2-furylvinylphosphonate, dibutyl 2-thienylvinylphosphonate, dibutyl 2-pyridylvinylphosphonate, and dibutyl 3-pyridylvinylphosphonate.

Novel esters of heterocyclic-vinylphosphonates are prepared by reacting at a temperature in the range from about 0° C. to 150° C., preferably 20–80° C., an ester of methylene diphosphonic acid having the formula

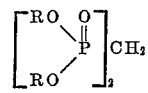

in which R is the same as defined above, with an aldehyde of a heterocyclic compound having the formula

R'CHO in which R' is a heterocyclic radical as defined above, in the presence of an alkali metal hydride, e.g., NaH or an alkali metal, e.g. Na, K or Li.

The method of preparing the compounds is further illustrated by the following equation in which R is butyl and R' is furyl:

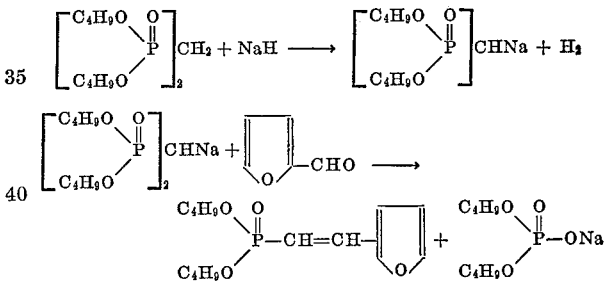

In carrying out the above reaction, a dispersion of the alkali metal hydride, e.g., NaH, is placed in an organic solvent, e.g., diethyl ether, and bis(dibutoxyphosphonyl)methane, as shown above, is added slowly at about 25 to 30° C. without cooling. The reaction mass is then stirred for a period sufficient for the reaction between the alkali metal hydride and the ester to take place to form the sodio compound of the ester, e.g., about 15 minutes. The heterocyclic aldehyde, e.g. furfural, is then added slowly while the temperature is kept below about 35° C. by means of occasional cooling. The resulting solution is extracted about three times with water, dried over magnesium sulfate, filtered, and the solvent removed by distillation. The dibutyl 2-furylvinylphosphonate then is recovered by distillation of the remaining reaction mass.

The esters of methylene diphosphonic acid used in preparing the novel compounds of the invention are known in the art and/or can be made by the methods of K. A. Petrov et al., Zhur. Obschei Khim. 30, 1602–8 (1960), Chemical Abstracts, vol. 55, page 1414 d. Aldehydes of heterocyclic compounds are well known. Examples of esters of methylene diphosphonic acid, especially preferred for practice of this invention, are the following:

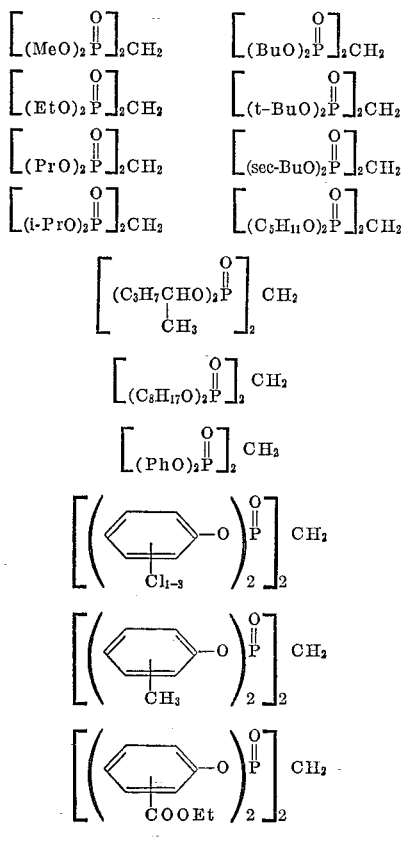

Examples of heterocyclic aldehydes especially preferred for practice of this invention are the following:

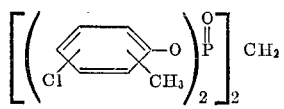

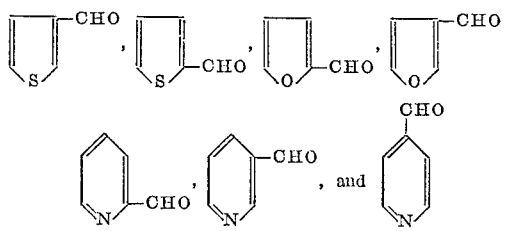

Examples of alkali metal hydrides are the following: NaH, KH, and LiH.

Inert solvents which can be used in practice of the invention include aromatic hydrocarbons, preferably, benzene, toluene, xylene; ethers, e.g. diethylether, dioxane; and other solvents which are nonreactive in the presence of an alkali metal hydride.

The practice of the preparation and some properties of the novel compounds of the invention are illustrated in the following examples:

Example 1.—Preparation of dibutyl 2-furylvinylphosphonate 5.4 grams (0.12 mole) of sodium hydride (53.3% dispersion) were washed twice with 150 ml. portions of petroleum ether to remove the mineral oil from the sodium hydride. 150 ml. of anhydrous ether were then added to the vessel.

42 grams (0.114 mole) of bis(dibutoxyphosphonyl) methane were added to the vessel next at 30° C. The mass was stirred for about 15 minutes, during which time a clear solution was formed. Next, 11.0 grams (0.114 mole) of furfural were added, while keeping the temperature below 35° C. After addition, stirring was continued for about 15 minutes. The solvent then was evaporated, leaving an oily residue containing some precipitated solids. The residue was washed with petroleum ether, extracted with water, and the mixed water extract was further extracted with petroleum ether. The recovered petroleum ether solution was then distilled, leaving an oily residue. Distillation gave two fractions, the first having B.P. 119–20.5°/0.05 mm.; and $n_{25}{}^D$—1.4958; and the second, amounting to 22 grams, having B.P. 121–20/05 mm.; and $n_{25}{}^D$—1.4995. The second fraction represented a 69.6% conversion of the starting material to dibutyl 2-furylvinylphosphonate. Redistillation of the second fraction gave 11.0 grams of product having B.P. 121–20/0.05 mm. $n_{25}{}^D$—1.5002. Analysis for carbon, hydrogen and phosphorus content of dibutyl 2-furylvinylphosphonate gave the following:

Calculated: percent C, 58.75; percent H, 8.10; percent P, 10.81. Found: percent C, 59.30; percent H, 8.34; percent P, 10.21.

Example 2.—Preparation of dibutyl 2-pyridylvinylphosphonate

Following substantially the same procedure described in Example 1, 4.5 grams of a 53.3% NaH dispersion were reacted with 39.3 grams (0.098 mole) of bis(dibutoxyphosphonyl)methane at 25–30° C. with stirring and without cooling. After about 15 minutes, 10.6 grams (0.098 mole) of pyridine 2-carboxaldehyde were added dropwise, in about 0.45 hour, while keeping the temperature below 35° C. by means of occasional cooling. The resulting solution was extracted as described in Example 1. Distillation of the extract from the reaction mass gave the following fractions:

first—B.P. up to 160.5°/0.15 mm.; 0.5 g. having $n_{25}{}^D$—1.4925 and
second—B.P. 160.5–161.5° C./0.15 mm.; 16.9 grams (58% conversion).

Analysis of the compound of the second fraction for percent carbon, hydrogen, nitrogen and phosphorous content of dibutyl pyridylvinylphosphonate, gave the following results:

Calculated: percent C, 60.58; percent H, 8.13; percent N, 4.71; percent P, 10.42. Found: percent C, 60.13; percent H, 8.39; percent N, 4.89; percent P, 10.02.

Example 3.—Preparation of dibutyl 2-thienylvinylphosphonate

Following the procedure of Example 1, the sodium salt of tetrabutyl methylene bisphosphonate was prepared from 7.7 grams of 52% NaH dispersed in 250 ml. of ether and 66.7 grams (0.167 mole) of the ester. To the sodio compound thus formed, 18.7 grams (0.167 mole) of thiophene 2-carboxaldehyde were added dropwise in about 20 minutes, keeping the temperature below 32° C. The mixture was stirred for about 2 hours. The reaction mass was diluted with 250 ml. of ether and 250 ml. of water. The ether layer was recovered and further extracted with water, dried, filtered and the solvent then boiled off. Distillation of the residue containing the product gave the following fractions:

first—B.P. up to 130° C./0.02 mm., 1 gram.
second—B.P. 129–130° C./0.02 mm.; $n_{25D}$—1.5256; 35.5 grams (71% conversion).

Analysis of the second fraction for carbon, hydrogen, phosphorous, and sulfur content of dibutyl 2-thienylvinylphosphonate gave the following resutls:

Calculated: percent C, 55.58; percent H, 7.66; percent P, 1023; percent S, 1061. Found: percent C, 55.53; percent H, 7.95; percent P, 10.06; percent S, 10.84.

Example 4.—Preparation of dibutyl 3-pyridylvinyl-phosphonate

Following the procedure of Example 1, 66.7 grams (0.167 mole) of tetrabutyl methylene bisphosphonate were reacted with 7.7 grams of 52% NaH in 300 ml. of toluene. Then, 17.9 grams (0.167 mole) of pyridine 3-carboxaldehyde were added dropwise in about 15 minutes, while keeping the temperature below 35° C. After the mass was stirred for one hour, 200 ml. of toluene and 150 ml. of water were added. The toluene layer was recovered, washed with water, dried over $MgSO_4$, filtered, and the toluene evaporated from the mass. Distillation of the residue gave the following fractions:

first—B.P. up to 156° C./0.09 mm.
second—B.P. 156–157° C./0.09 mm.; 28.2 grams, (57% conversion).

A sample of the second fraction was submitted for analysis for carbon, hydrogen, nitrogen, and phosphorus content of dibutyl 3-pyridylvinylphosphonate gave the following results:

Calculated: percent C, 60.58; percent H, 8.13; percent N, 4.71; percent P, 1042. Found: percent C, 60.09; percent H, 7.91; percent N, 4.61, percent P, 10.15.

The novel compounds of this invention are useful for plant growth regulation, particularly, as pre-emergence and post-emergence herbicides, as is illustrated in the following examples:

Example 5.—Pre-emergence killing of crabgrass

The compounds of the invention have herbicidal activity as pre-emergence weed killers, particularly against crabgrass. Seeds of crabgrass were planted in soil in flats in a greenhouse, covered, and a compound of the invention in the form of a 10% by weight solution in diacetone alcohol was applied directly to the soil surface. The following results were obtained:

Compound: Percent kill at 10 lbs. of compound/acre
Dibutyl 2-(2-furyl)vinylphosphonate _____ 20
Dibutyl 2-(2-thienyl)vinylphosphonate _____ 10
Dibutyl 2-(2-pyridyl)vinylphosphonate _____ 60
Dibutyl 2-(3-pyridyl)vinylphosphonate _____ 20

Example 6.—Pre-emergence killing of lambsquarter

The 2-pyridyl- and 3-pyridyl-compounds of the invention have herbicidal activity as pre-emergence weed killers for lambsquarter. The test was carried out as described in Example 5. The following results were obtained:

Compound: Percent kill at 10 lbs. of compound/acre
Dibutyl 2-(2-pyridyl)vinylphosphonate _____ 40
Dibutyl 2-(3-pyridyl)vinylphosphonate _____ 40

Example 7.—Pre-emergence killing of amaranthus 2-pyridyl-, and 3-pyridyl-compounds of the invention have herbicidal activity as pre-emergence killers for amaranthus. The test procedure was the same as in preceding examples. The following results were obtained:

Compound: Percent kill at 10 lbs. of compound/acre
Dibutyl 2-(2-pyridyl)vinylphosphonate _____ 75
Dibutyl 2-(3-pyridyl)vinylphosphonate _____ 80

Example 8.—Pre-emergency killing of foxtail

The 2-furyl- and 3-pyridyl-compounds of the invention have herbicidal activity as pre-emergence killers against foxtail. The previously described test procedure was used, and the following results were obtained:

Compound: Percent kill at 10 lbs. of compound/acre
Dibutyl 2-(2-furyl)vinylphosphonate _____ 30
Dibutyl 2-(3-pyridyl)vinylphosphonate _____ 25

Example 9.—Crop desiccation

The compounds of the invention have activity as desiccants for foliage of growing plants, e.g. trees, bushes and, especially, crops, e.g., sugar beets, cotton, peas, soybeans and flax. The activity is of varying degree as shown below for flax. Application in the form of a 10% by weight solution in diacetone alcohol was made on the flax crop when the plants were four to eight inches in height in greenhouse flats.

Compound: Percent desiccation at 5 lbs. of compound/acre
Dibutyl 2-(2-furyl)vinylphosphonate _____ 15
Dibutyl 2-(2-thienyl)vinylphosphonate _____ 80
Dibutyl 2-(2-pyridyl)vinylphosphonate _____ 20
Dibutyl 2-(3-pyridyl)vinylphosphonate _____ 50

Example 10.—Activity as nematocide

The 2-furyl- and 2-thienyl-compounds of the invention have activity as fumigants for nematodes. A 10% solution in diacetone alcohol was made of each compound tested. The chemical was injected two inches into one quart of soil. A vial containing a suspension of nematodes mixed in sand was placed on the soil surface. The jar was sealed, and the percentage nematode kill was determined fater 48 hours. With dibutyl 2-(2-furyl)vinylphosphonate, kills of 100% and 87% were obtained at a dosage of 0.0625 g. of compound/1 qt. of soil. With dibutyl 2-(2-thienyl)vinylphosphonate, a kill of 100% was obtained with 0.25 g. of compound/1 qt. of soil, and a kill of 70% was obtained with 0.125 g. of compound/1 qt. of soil.

Example 11.—Mosquito larvacide

Dibutyl 2-(2-furyl)vinylphosphonate was dissolved in acetone to make a 0.1% by weight solution. The solution was further diluted with water and then was tested on 20 to 30 fourth-instar larvae. At 10 p.p.m., a kill of 80–100% was obtained within 48 hours. At 1 p.p.m., a kill of 10–40% was obtained in the same time.

The specific quantities per acre and application concentrations to be used of any of the compounds of the invention for the pre-emergence, nematocidal, desiccant and larvacidal compositions and methods, respectively, can readily be determined by one skilled in the respective arts. In general, less than about 50 lbs. per acre applied at a concentration of less than about 25% by weight of solution or dust formulation of any of the compounds of this invention, as an active ingredient will be found advantageous, and preferably, solutions containing about 10% of a compound of this invention or an active ingredient, applied at 5–10 lbs. per acre, are used. The usual methods for making agricultural solutions and dust formulations are well known to those skilled in the art and can be used in practicing the invention with the novel compounds hereof.

It is to be understood that although the invention has been described with specific reference to particular embodiments, it is not limited to such embodiments, and the invention is intended to include all modifications within the scope of the appended claims.

We claim:
1. An ester of a heterocyclic vinylphosphonate represented by the formula

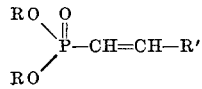

where R is butyl and R' is a heterocyclic radical selected from the group consisting of

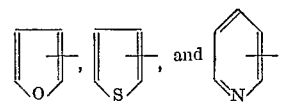

2. A compound according to claim 1 wherein R' is furyl.
3. A compound according to claim 1 wherein R' is thienyl.
4. A compound according to claim 1 wherein R' is pyridyl.
5. Dibutyl 2-furylvinylphosphonate.
6. Dibutyl 2-thienylphosphonate.
7. Dibutyl 2-pyridylvinylphosphonate.
8. Dibutyl 3-pyridylvinylphosphonate.

References Cited

UNITED STATES PATENTS 3,080,273   3/1963   Baker et al. _____ 167—22

OTHER REFERENCES

Henning et al.: Zeithchrift für Chemie, vol. 6, No. 1, January 1966, pp. 28–29.

HENRY R. JILES, Primary Examiner

C. M. SHURKO, Assistant Examiner

U.S. Cl. X.R.

71—86; 260—250, 251, 283, 287, 290, 295, 302, 329, 332.2, 332.5, 346.1, 347.4; 424—200, 202, 203

UNITED STATES PATENT OFFICE
CERTIFICATE OF CORRECTION

Patent No. 3,462,439          Dated 4/19/69

Inventor(s) Ivan C. Popoff/James Louis Dever

It is certified that error appears in the above-identified patent and that said Letters Patent are hereby corrected as shown below:

Column 2, lines 31-35, right hand formula should read:

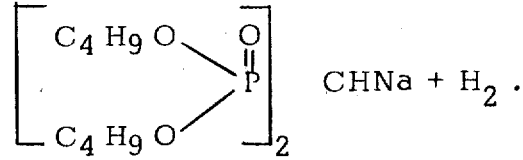

Column 4, line 67, "$n_{25D}$" should read $n_{25}^D$.

Column 4, line 74 should read --P, 10.23 --S, 10.61--.

Column 5, line 23 should read --P, 10.42--.

Column 6, line 26, "fater" should read --after--.

Column 7, Claim 6, "2-thienylphosphonate" should read -- 2-thienylvinylphosphonate.

SIGNED AND SEALED

APR 7 1970

(SEAL)
Attest:

Edward M. Fletcher, Jr.
Attesting Officer

WILLIAM E. SCHUYLER, JR.
Commissioner of Patents